(12) United States Patent  (10) Patent No.: US 8,287,223 B2
Andersen et al.  (45) Date of Patent: Oct. 16, 2012

(54) TRACK FOLLOWER FOR A VEHICLE RESTRAINT

(75) Inventors: Jonathan Andersen, Racine, WI (US); Timothy Cotton, Milwaukee, WI (US)

(73) Assignee: Rite-Hite Holding Corporation, Milwaukee, WI (US)

( * ) Notice: Subject to any disclaimer, the term of this patent is extended or adjusted under 35 U.S.C. 154(b) by 798 days.

(21) Appl. No.: 11/956,156

(22) Filed: Dec. 13, 2007

(65) Prior Publication Data

US 2009/0155030 A1   Jun. 18, 2009

(51) Int. Cl.
  *B65F 9/00* (2006.01)
(52) U.S. Cl. ........................................................ 414/401
(58) Field of Classification Search .................. 414/401; 384/53, 58
  See application file for complete search history.

(56) References Cited

U.S. PATENT DOCUMENTS

| | | | |
|---|---|---|---|
| 2,383,195 A * | 8/1945 | Horman | 384/53 |
| 2,565,853 A * | 8/1951 | Jacobson | 384/53 |
| 4,443,150 A | 4/1984 | Hahn et al. | |
| 4,915,568 A | 4/1990 | West | |
| 5,297,921 A | 3/1994 | Springer et al. | |
| 5,620,259 A * | 4/1997 | Mainardi | 384/58 |
| 5,964,572 A | 10/1999 | Hahn et al. | |
| 6,190,109 B1 | 2/2001 | Bender | |
| 6,322,310 B1 | 11/2001 | Bender et al. | |
| 6,431,819 B1 | 8/2002 | Hahn | |
| 6,488,464 B1 * | 12/2002 | Kish | 414/401 |
| 6,648,508 B1 * | 11/2003 | Brunk et al. | 384/57 |
| 6,964,289 B2 * | 11/2005 | Schulte | 160/1 |
| 7,056,077 B2 * | 6/2006 | Pedersen et al. | 414/401 |
| 7,384,229 B2 * | 6/2008 | Gleason | 414/401 |
| 2006/0140519 A1 * | 6/2006 | Fournier | 384/58 |
| 2008/0095598 A1 * | 4/2008 | Cotton et al. | 414/401 |

* cited by examiner

*Primary Examiner* — Joshua Rudawitz
(74) *Attorney, Agent, or Firm* — Hanley, Flight & Zimmerman, LLC

(57) ABSTRACT

A vehicle restraint includes a hook supported by a carriage that travels vertically along a track, wherein the hook can move to selectively restrain or release a vehicle's ICC bar at a loading dock. The carriage includes a unique roller arrangement that minimizes friction while maximizing the rolling line contact between a set of rollers and the track. Instead of individual rollers mounted at opposite ends of a shaft extending from the carriage, two or more rollers are mounted to a module, and two such modules are rotatably or otherwise movably attached to the ends of the shaft. Each module includes a shaft-receiving bore having an inner diameter comparable to that of a conventional individual roller, thus the unique roller arrangement lends itself well to retrofit applications.

21 Claims, 7 Drawing Sheets

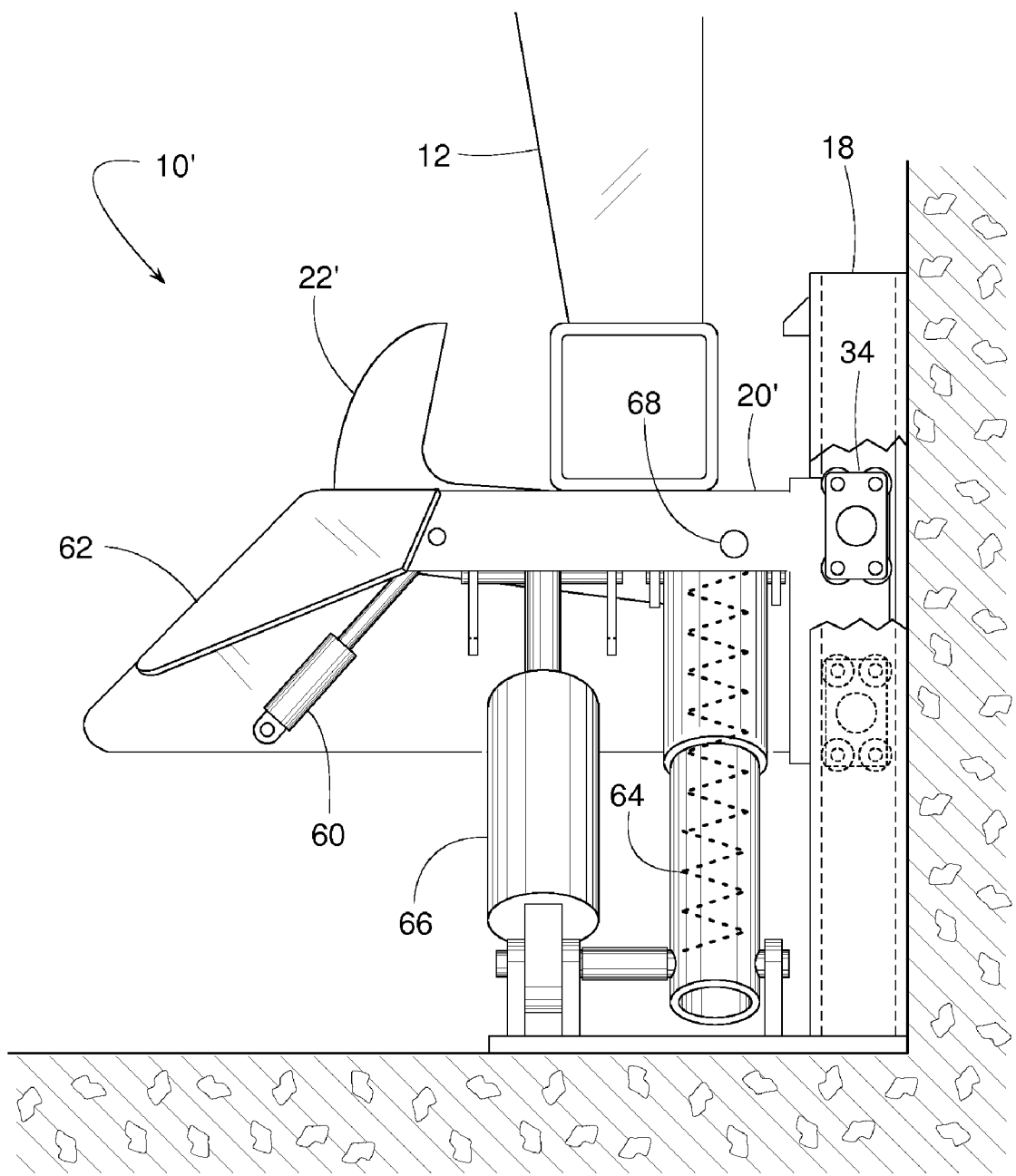

TRACK FOLLOWER FOR A VEHICLE RESTRAINT

FIELD OF THE INVENTION

The subject invention generally pertains to a vehicle restraint at a loading dock and more specifically to the restraint's guide track and track follower.

BACKGROUND OF RELATED ART

A typical truck loading dock of a building includes an exterior doorway with an elevated platform for loading and unloading vehicles such as trucks and trailers. Many loading docks have a dock leveler to compensate for height differences between the loading dock platform and an adjacent bed of the truck or trailer. A typical dock leveler includes a deck, also known as a ramp or dockboard, which is pivotally hinged along its back edge to vary the height of its front edge. An extension plate, or lip, extends outward from the deck's front edge to span the gap between the rear of the trailer bed and the front edge of the deck. Extending from the deck's front edge, the lip rests upon the truck bed to form a bridge between the deck and the bed. This allows personnel and material handling equipment, such as a forklift, to readily move on and off the vehicle during loading and unloading operations.

To help hold the vehicle sufficiently close to the dock platform so that the lip of the dock leveler can remain resting upon and supported by the bed of the vehicle, loading docks often include a vehicle restraint that helps prevent the vehicle from accidentally pulling away from the dock. Vehicle restraints, such as those disclosed in U.S. Pat. Nos. 4,443,150 and 4,915,568, usually include a hook or barrier that restrains the vehicle by reaching up in front of the vehicle's RIG (rear impact guard), also known as an ICC bar. An ICC bar is a beam that extends horizontally across the rear of a truck, just below the truck bed. An ICC bar's primary purpose is to prevent an automobile from under-riding the truck in a rear-end collision.

When a forklift drives over the dock leveler and onto the trailer bed, the weight of the forklift and the cargo it may be carrying can add a significant load to the truck bed. Likewise, when the forklift exits the truck bed, substantial weight is removed from the trailer. Thus, the load carried by the trailer changes repeatedly during the loading/unloading process. The trailer's suspension may respond to these load changes by allowing the trailer and its ICC bar to rise and fall accordingly. The vertical movement can be particularly pronounced when the vehicle has an air suspension system.

As the vehicle moves up and down, the vehicle restraint's hook preferably moves with it to prevent the ICC bar from rising up and over the hook, and thereby disengaging from the barrier. Many barrier restraints can follow the vertical movement of an ICC bar because the barriers are usually mounted to a carriage or sliding member that can travel along a vertical guide track. Unfortunately, vehicles with air suspension often have a generally equal but horizontal component of movement for every vertical movement. Such horizontal movement can apply a substantial horizontal force between the carriage and the guide track. Repeated vertical and thus horizontal movement of the barrier creates localized wear due to the concentrated horizontal line contact between the guide track and the individual rollers of the carriage. Sliding members without rollers distribute the wear more evenly over a broader contact area; however, friction associated with sliding members is typically greater than that of rolling elements, thus wear is a problem with sliding members as well.

Although the vehicle restraint shown in U.S. Pat. No. 4,443,150 has six rollers to help distribute the load, such a design has its drawbacks. If all six rollers are not perfectly parallel to the guide track due to manufacturing tolerances of the size and location of the rollers or nonlinearity of the track, some rollers may carry substantially more load than others. Even if all six rollers are perfectly aligned parallel to a perfectly straight track, an ICC bar pulling the hook forward or pushing the hook down might apply a rotational moment on the carriage such that the upper most rollers push forward on one side of the track while the lowermost rollers press against the rear surface of the track, thereby possibly leaving the rollers of intermediate height only lightly loaded or substantially unloaded. Moreover, if each pair of horizontally displaced rollers is mounted to its own shaft, the added number of shafts can add bulk, weight and cost to a vehicle restraint.

Consequently, there is a need for a vehicle restraint that minimizes the wear between the carriage of a vertically movable barrier and the track along which the carriage travels.

BRIEF DESCRIPTION OF THE DRAWINGS

FIG. 7 is a side view of a vehicle restraint with a pivotal hook.

DESCRIPTION OF THE PREFERRED EMBODIMENT

Figure 1:
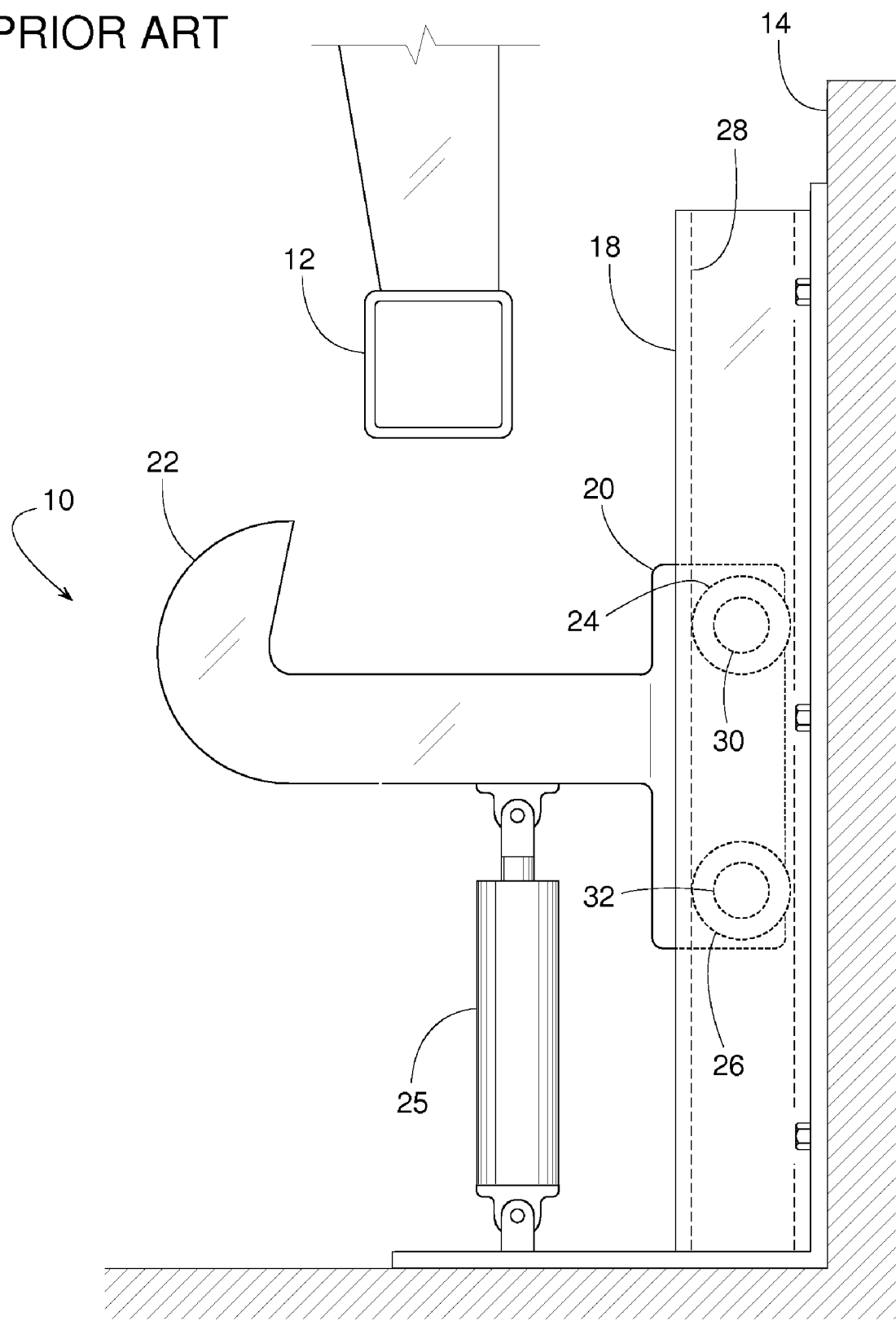
FIG. 1 is a side view of a conventional vehicle restraint in a lowered release position.
Figure 2:
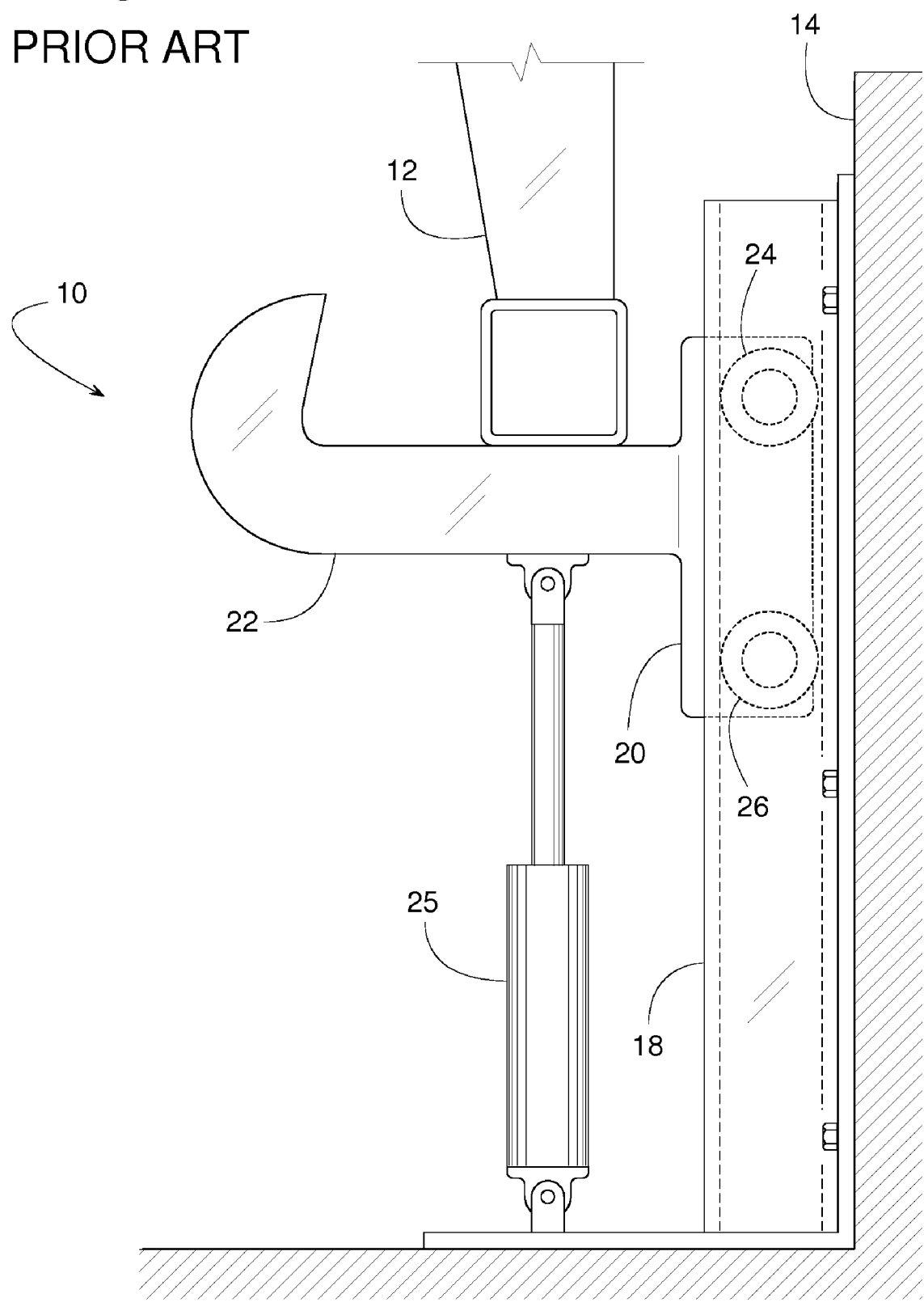
FIG. 2 is a side view similar to FIG. 1 but showing the restraint in a raised blocking position.
Figure 3:
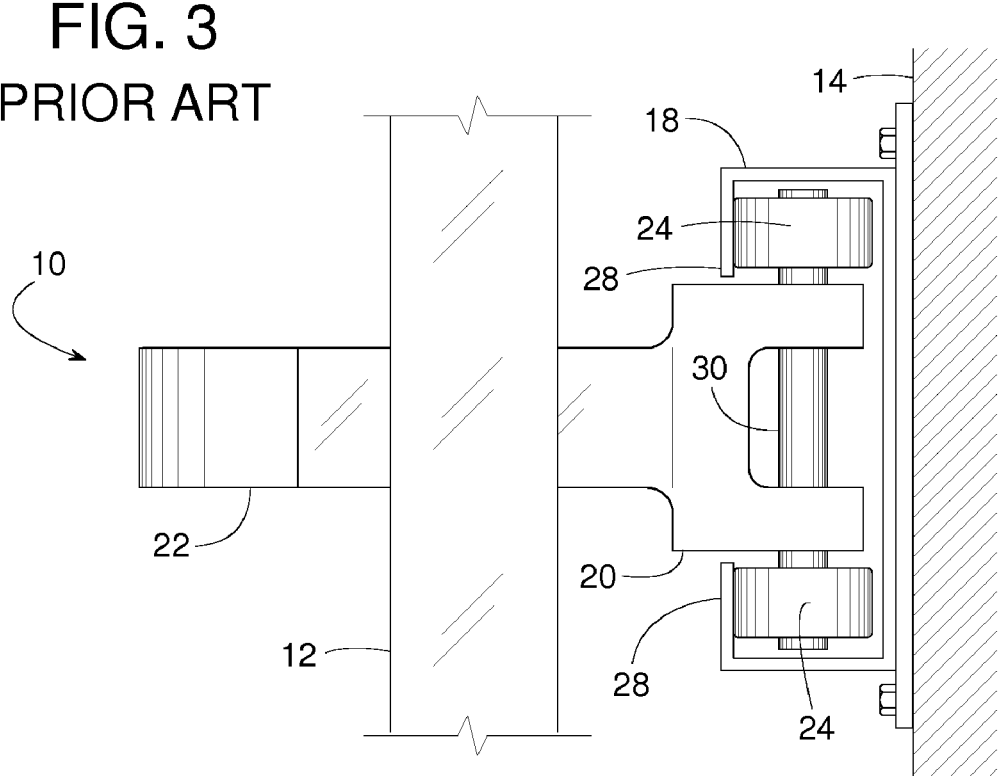
FIG. 3 is a top view of FIG. 1.
Figure 4:
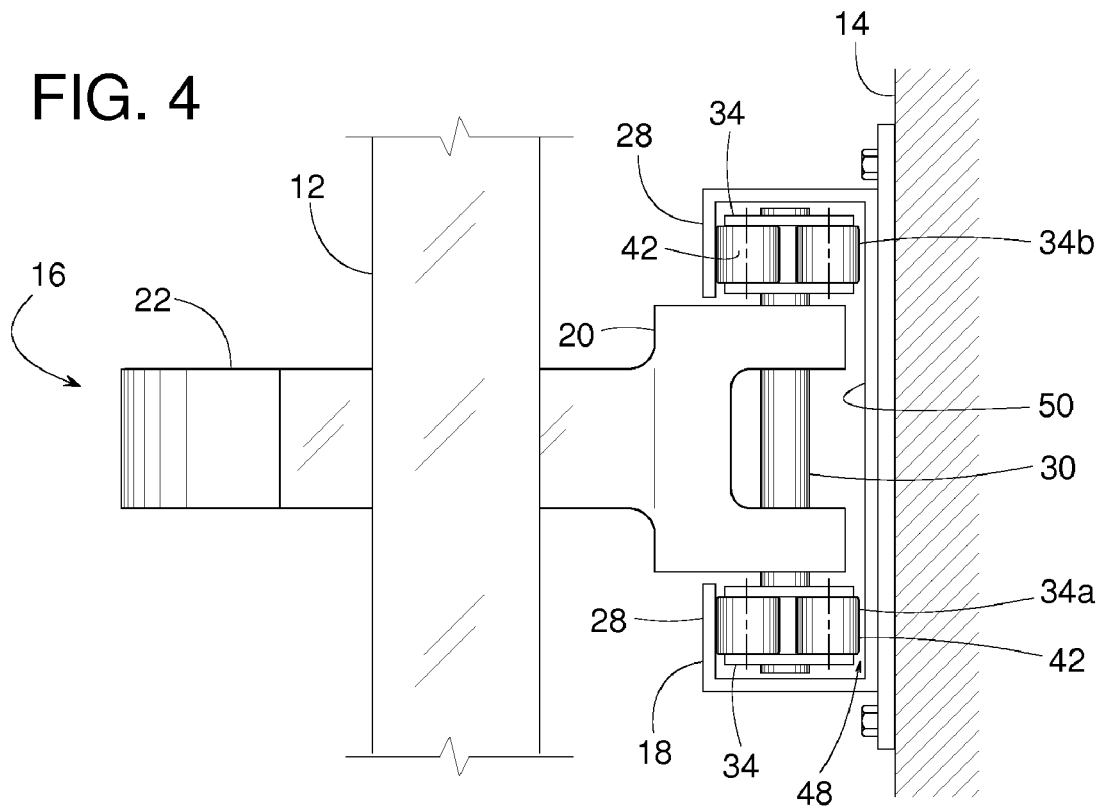
FIG. 4 is a top view showing one embodiment of a novel vehicle restraint in a lowered release position.
Figure 5:
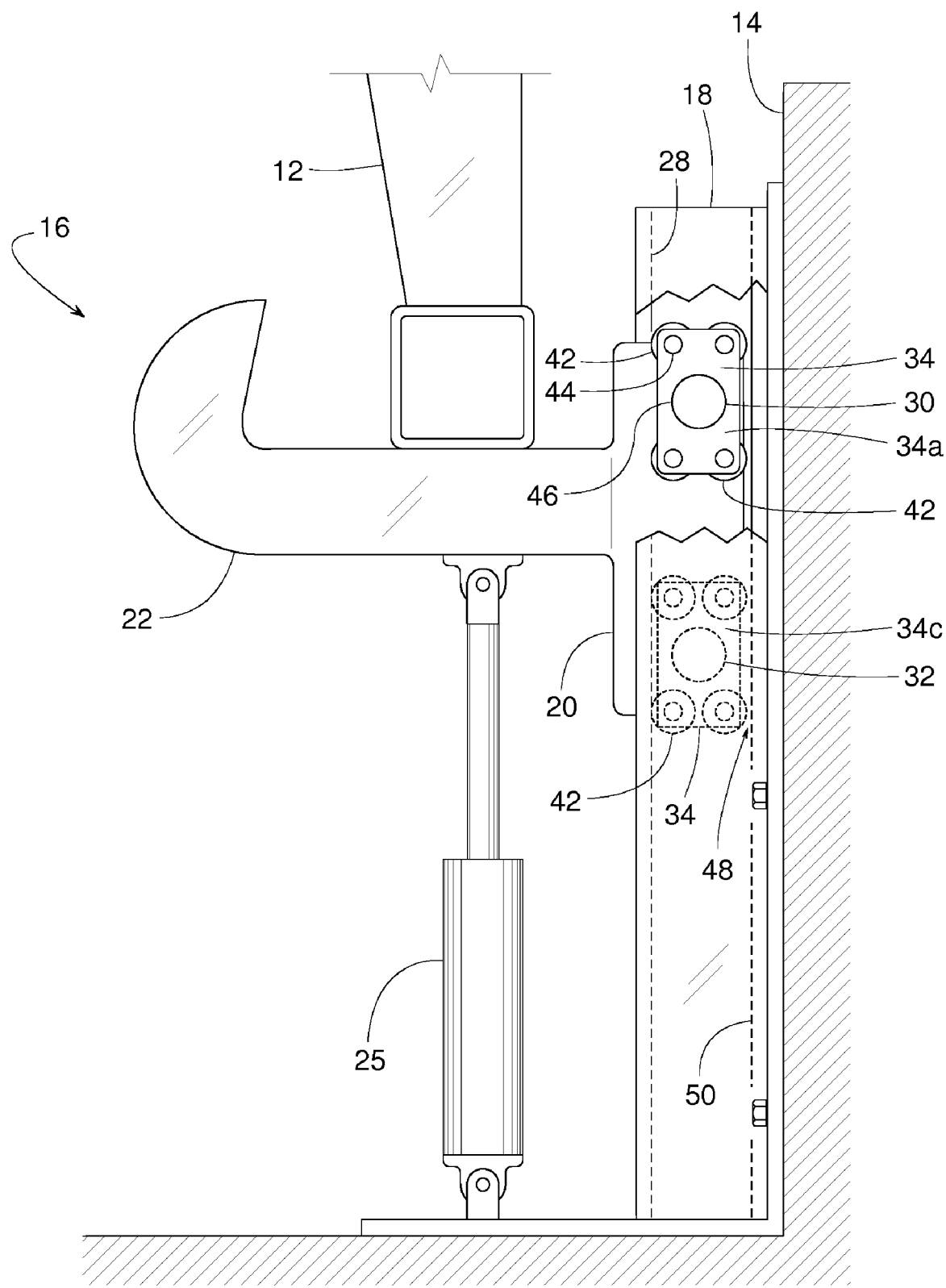
FIG. 5 is a side view of the vehicle restraint of FIG. 4 but showing the restraint in a raised blocking position.

FIGS. 1-3 show a conventional vehicle restraint 10 for restraining a vehicle 12 (e.g., via the vehicle's ICC bar) adjacent a loading dock face 14, and FIGS. 4 and 5 show an improved vehicle restraint 16 that provides a more effective distribution of load between a guide track 18 and a set of rollers that travel along track 18. Restraints 10 and 16 are shown in their basic form to more clearly illustrate the subject invention, which can be readily incorporated in a wide variety of more complicated restraint designs such as those disclosed in U.S. Pat. Nos. 6,431,819; 6,322,310; 6,190,109; 5,964,572; 5,297,921 and 4,443,150; all of which are specifically incorporated by reference herein.

Vehicle restraints 10 and 16 each include a restraining structure 17 and a track 18 mountable to dock face 14. Restraining structure 17 comprises a base 20 vertically movable along track 18 and a hook 22 supported by base 20. As used herein, the term "base" is interchangeable with "track follower" and has been adopted in the interest of brevity and readability. Use of the term "base" is not meant to be limiting in connoting a structure or support that is under something. Rather the base/track follower forms a part of the overall restraining structure 17 along with a "hook" 22. Hook in this context should also be broadly construed to connote a member coupled to the base and adapted to selectively engage and release a vehicle's ICC bar—either by being fixed to the base, or coupled for the movement relative thereto. Vehicle restraints 10 and 16 also include an actuator 25 (e.g., piston/cylinder, hydraulic motor, electric motor, linear motor, etc.) for moving hook 22 between a raised position (FIGS. 2 and 5) and a lowered position (FIGS. 1, 3 and 4) to respectively block and release the ICC bar of vehicle 12.

The actual construction of hook 22 and base 20 may vary. In some cases, hook 22 is rigidly attached or is an integral extension of base 20, whereby the two move in unison. In other cases, a hook 22' can pivot or otherwise move relative to a base 20' as is the case with a vehicle restraint 10' shown in FIGS. 7 and 7a-c. At least some of the patents that have been incorporated by reference provide additional examples of vehicle restraints with a pivotal hook.

To hold hook 22 in relation to dock face 14 and to enable base 20 to travel smoothly along the height of track 18, vehicle restraint 10 of FIGS. 1-3 includes an upper set of rollers 24 and a lower set of rollers 26 that are captured by vertical flanges 28 of track 18. Roller sets 24 and 26 are rotatably coupled to base 20 by way of upper and lower shafts 30 and 32, respectively. Since each roller of sets 24 and 26 are in virtual horizontal line contact with track 18, the load between track 18 and roller sets 24 and 26 is concentrated along approximately four rolling lines of contact.

Figure 6:
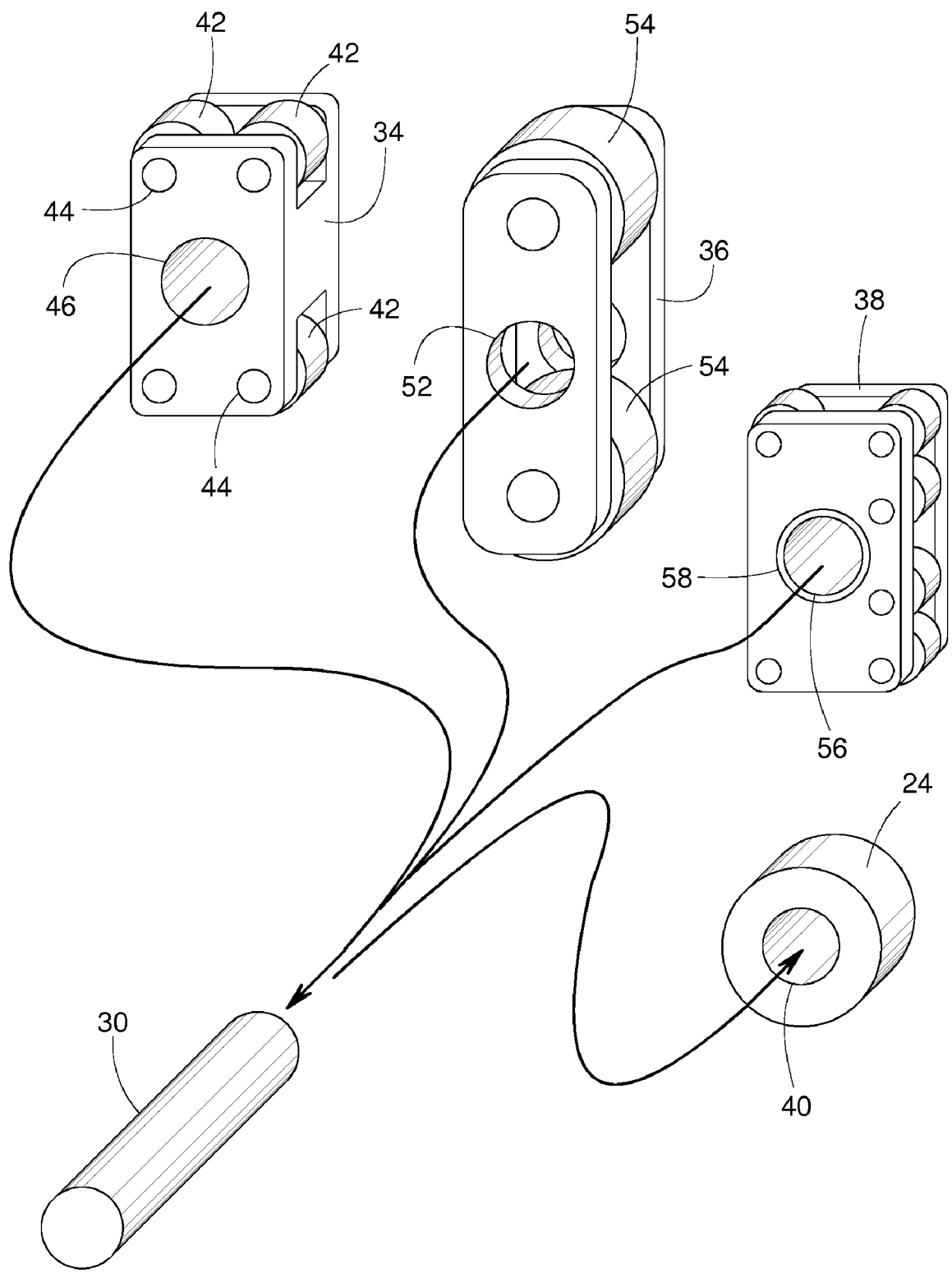
FIG. 6 is a perspective view showing a method of retrofitting a vehicle restraint.

To distribute the load more broadly over a greater number of rolling lines of contact, roller sets 24 and 26 can be replaced by roller modules such as modules 34, 36 or 38 of FIG. 6. This is possible because modules 34, 36 and 38 each have a shaft-mounting bore that is approximately the same diameter of a shaft-mounting bore 40 of rollers 24 and 26. In addition to the benefit of having more rolling lines of contact, the even distribution of load is further improved because modules 34, 36 and 38 distribute its rollers both above and below shaft 30. The roller modules described herein can be provided as factory installed options sold with vehicle restraints, and/or, the roller modules described herein can be retrofit to vehicle restraints already existing in the field.

Referring to FIGS. 4 and 5, vehicle restraint 16 has four roller modules 34 instead of roller sets 24 and 26 of FIGS. 1-3. Restraint 16 can be originally made this way, or restraint 16 can be the result of retrofitting restraint 10 of FIGS. 1-3. In either case, the roller module 34 includes a first upper module 34a, a second upper module 34b, a first lower module 34c and a second lower module (the second lower module is hidden from view underneath module 34b and is behind module 34c with respect to FIG. 5). Each module 34 includes four relatively small diameter rollers 42 that can each rotate about its own relatively small axle 44. A shaft-mounting bore 46 allows modules 34a and 34b to be mounted to upper shaft 30 and allows modules 34c and one opposite thereto to be mounted to lower shaft 32. Limited rotational or translational movement between module 34 and shaft 30, or similar movement between shaft 30 and base 20 enables modules 34 to align themselves in firm rolling contact with track 18 regardless of some dimensional tolerance of the vehicle restraint's component parts.

If four roller modules 34 replace roller sets 24 and 26, the rolling line contact with track 18 can at least double. If some horizontal clearance 48 exists between rollers 42 of module 34 and the contact surfaces of track 18 (i.e., the inside surface of flange 28 or a back side 50 of track 18), then the rolling line contact with track 18 increases from four rolling line contacts provided by rollers 24 and 26, to eight rolling line contacts provided by rollers 42. If, however, module 34 fits tightly within track 18 with no horizontal clearance 48, then all of rollers 42 will be in rolling line contact with track 18 to provide sixteen rolling line contacts.

Alternatively, roller module 36 could be used instead of module 34, as module 36 has a shaft-mounting bore 52 that also fits the outer diameter of shafts 30 and 32. If four roller modules 36 replace roller sets 24 and 26, the rolling line contact with track 18 can double. In this case, some horizontal clearance 48 is particularly beneficial to prevent one side of a roller 54 from dragging against one of the contact surfaces 28 or 50 of track 18 while the opposite side of the same roller 54 is in rolling contact with track 18.

As another alternative, roller module 38 could be used instead of modules 34 or 36, as module 38 has a shaft-mounting bore 56 that can also fit the outer diameter of shafts 30 and 32 via, for example, a bushing 58. If four roller modules 38 replace roller sets 24 and 26, the rolling line contact with track 18 increases from four rolling line contacts provided by roller sets 24 and 26, to eight rolling line contacts provided by the roller module 38 when some horizontal clearance 48 exists between the rollers of the module 38 and the guide track 18, or to as many as 24 rolling line contacts when the roller modules 38 fit tightly within guide track 18 (i.e., in the presence of little horizontal clearance between the rollers of the module 38 and the guide track).

Figure 7A:
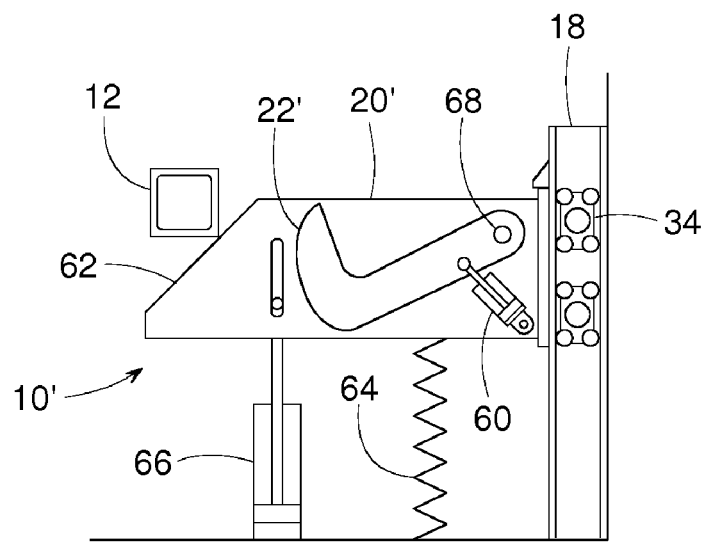
FIGS. 7*a-c* are schematic side views illustrating an operational sequence of the vehicle restraint of FIG. 7.
Figure 7B:
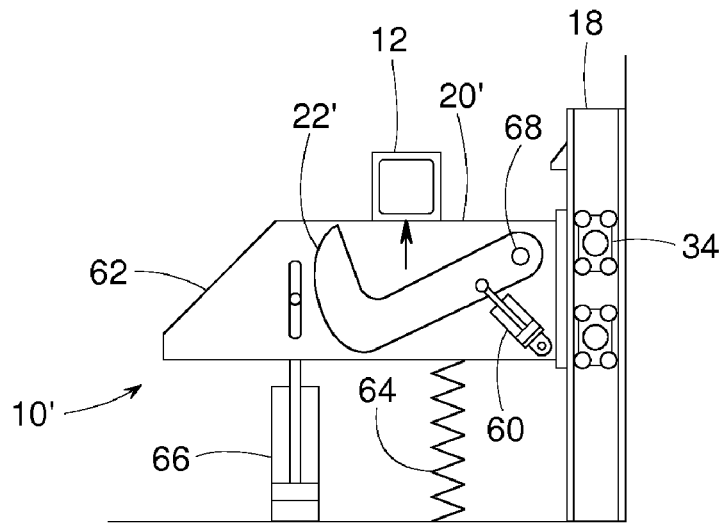

Any of the roller modules 34, 36 and 38 could also be incorporated into a vehicle restraint with a pivotal hook, such as vehicle restraint 10' of FIGS. 7 and 7a-c. Roller module 34, for instance, could couple base 20' to track 18. In this case, a pin 68 pivotally couples hook 22' to base 20', and an actuator 60 moves hook 22' between a blocking position (FIGS. 7 and 7c) and a retracted position (FIGS. 7a and 7b).

Figure 7C:
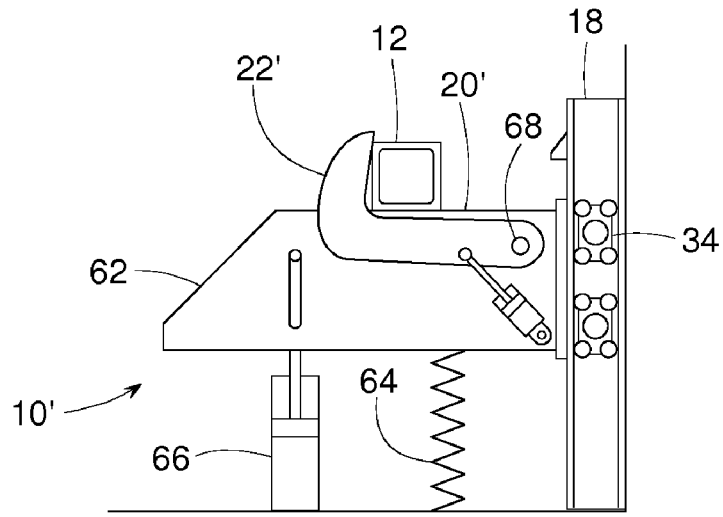

FIGS. 7a-c schematically illustrate an operating sequence of vehicle restraint 10'. As vehicle 12 backs into the loading dock, as shown in FIG. 7a, the ICC bar of vehicle 12 pushes against an inclined edge 62 of base 20', which forces base 20' down underneath the ICC bar as shown in FIG. 7b. A spring 64 holds base 20' solidly up against the ICC bar even if the ICC bar moves up and down in reaction to vehicle 12 being loaded or unloaded of its cargo. Actuator 60 raises hook 22' from its retracted position of FIG. 7b to its blocking position of FIG. 7c, thereby restraining vehicle 12 at the loading dock. An optional hydraulic system 66 can be added to help restrict or dampen the vertical movement of the ICC bar.

In some embodiments, a vehicle restraint includes "floating" sets of rollers that help evenly distribute the load between a guide track and the rollers.

In some embodiments, a vehicle restraint includes a set of rollers that are pivotal or otherwise horizontally movable to compensate for nonlinearity of a guide track or other manufacturing tolerances.

In some embodiments, a vehicle restraint includes four or more rollers that are supported by a single main shaft.

In some embodiments, a vehicle restraint includes a plurality of rollers supported by a single main shaft, wherein the rollers are distributed both above and below the shaft.

In some embodiments, a vehicle restraint includes more than twice as many rollers as shafts for supporting them.

In some embodiments, a conventional vehicle restraint with a shaft supporting only two rollers is modified to create an improved retrofit restraint where the original shaft supports more than two rollers.

In some embodiments, a vehicle restraint is modified by replacing its original rollers with smaller ones, yet the modified restraint more evenly distributes the load between the guide track and the smaller rollers.

Although the invention is described with respect to a preferred embodiment, modifications thereto will be apparent to those of ordinary skill in the art. The scope of the invention, therefore, is to be determined by reference to the following claims:

The invention claimed is:

1. A vehicle restraint for restraining a vehicle relative to a loading dock face, the vehicle restraint comprising:
   a track mountable to the loading dock face;
   a base vertically movable relative to the track;
   a hook supported by the base and being movable relative to the loading dock face such that the hook can move to selectively block and release the vehicle;
   a first upper module rotatably coupled to the base via an upper shaft that extends through the base to define a common pivot axis of the first upper module, the upper shaft is to enable limited movement of the first upper module relative to the base;
   a first upper set of rollers engaging the track and being rotatably mounted to the first upper module and a first lower set of rollers engaging the track and being rotatably mounted to the first upper module, the first upper set of rollers and the first lower set of rollers to pivot together relative to the track about the common pivot axis when the first upper module pivots about the common pivot axis relative to the track;
   a second upper module coupled to the upper shaft to enable movement of the second upper module relative to the base about the common pivot axis defined by the upper shaft; and
   a second upper set of rollers engaging the track and being rotatably mounted to the second upper module.

2. The vehicle restraint of claim 1, further comprising:
   a first lower module rotatably coupled to the base via a lower shaft, the lower shaft to define a second common pivot axis; and
   a third upper set of rollers engaging the track and being rotatably mounted to the first lower module and a second lower set of rollers engaging the track and being rotatably mounted to the first lower module, the third upper set of rollers and the second lower set of rollers to pivot together relative to the track about the second common pivot axis when the first lower module pivots about the second common pivot axis relative to the track.

3. The vehicle restraint of claim 1, wherein the limited movement of the first upper module relative to the base is limited by available clearance between the track and the first upper and lower sets of rollers.

4. The vehicle restraint of claim 1, wherein the first upper module has at least some limited rotational movement relative to the base.

5. The vehicle restraint of claim 1, wherein the upper shaft is rotatably coupled to the base.

6. The vehicle restraint of claim 1, wherein the first upper set of rollers includes only two rollers.

7. The vehicle restraint of claim 1, wherein the first upper set of rollers includes at least four rollers.

8. The vehicle restraint of claim 1, wherein the hook is movable relative to the loading dock face by virtue of the base being vertically movable relative to the track.

9. The vehicle restraint of claim 1, wherein the first set of rollers includes at least two rollers such that an axis of a first roller of the at least two rollers is parallel to and spaced away from an axis of a second roller of the at least two rollers, and wherein the axes of the at least two rollers are parallel to and laterally spaced relative to the axis of the upper shaft.

10. The vehicle restraint of claim 1, wherein the first upper set of rollers comprises a first roller rotatably coupled to the first upper module about a first axis and a second roller spaced from the first roller and rotatably coupled to the first upper module about a second axis.

11. The vehicle restraint of claim 10, wherein the first lower set of rollers comprises a third roller spaced away from the first and second rollers and rotatably coupled to the first upper module about a third axis, and a fourth roller spaced away from the first, second and third rollers and rotatably coupled to the first upper module about a fourth axis, the first, second, third and fourth axes all being spaced apart and offset relative to the common pivot axis, and the first, second, third and fourth axes to pivot relative to the track about the common pivot axis.

12. The vehicle restraint of claim 11, wherein the first and second rollers are spaced equidistant from the common pivot axis and the third and fourth rollers are spaced equidistant from the common pivot axis.

13. The vehicle restraint of claim 1, wherein a roller from the first upper set of rollers has an axis that is offset relative to the common axis in both a first direction and a second direction relative to the common pivot axis, the first direction being different than the second direction.

14. A vehicle restraint for restraining a vehicle relative to a loading dock face, the vehicle restraint comprising:
   a track mountable to the loading dock face;
   a base vertically movable relative to the track;
   a hook supported by the base and being movable relative to the loading dock face such that the hook can move to selectively block and release the vehicle;
   a shaft rotatably coupled to the base and defining a pivot axis;
   a first roller supported by the shaft to engage a first portion of the track;
   a second roller supported by the shaft, wherein the first roller is above the second roller and the shaft, and the second roller is below the shaft; and
   a third roller supported by the shaft, the third roller being above the second roller and the shaft, and the third roller being positioned adjacent the first roller;
   a fourth roller supported by the shaft, the fourth roller being positioned below the first roller, the third roller and the shaft, and the fourth roller being positioned adjacent the second roller, wherein each of the first, second, third and fourth rollers includes an axle to enable each of the first, second, third and fourth rollers to rotate independently relative to each other and the shaft, and wherein the first, second, third and fourth rollers pivot together relative to the track about the pivot axis defined by the shaft.

15. The vehicle restraint of claim 14, wherein the first roller is one of a first set of rollers supported by the shaft, and the second roller is one of a second set rollers supported by the shaft, wherein all of the first set of rollers is above the second set of rollers and the shaft, and all of the second set of rollers is below the shaft.

16. The vehicle restraint of claim 14, wherein the hook is fixed relative to the base.

17. The vehicle restraint of claim 14, wherein the hook is pivotal relative to the base.

18. The vehicle restraint of claim 14, wherein each axle of the first, second, third and fourth rollers is positioned away from the pivot axis in a first position perpendicular relative to the pivot axis and a second position perpendicular relative to the pivot axis, wherein the first position is different than the second position.

19. A vehicle restraint for restraining a vehicle relative to a loading dock face, the vehicle restraint comprising:
   a track mountable to the loading dock face;

a base vertical movable relative to the track;

a hook supported by the base and being movable relative to the loading dock face such that the hook can move to selectively block and release the vehicle; and an upper module and a lower module, each independently and pivotally mounted to the base in a spaced relationship along the longitudinal direction of the track, the upper module to pivot about a first pivot axis defined by an upper shaft and the lower module to pivot about a second pivot axis defined by a lower shaft, the upper module having:

a first roller rotatably coupled to the first upper module about a first axis and a second roller spaced from the first roller and rotatably coupled to the first upper module about a second axis, a third roller spaced away from the first and second rollers and rotatably coupled to the first upper module about a third axis, and a fourth roller spaced away from the first, second and third rollers and rotatably coupled to the first upper module about a fourth axis, the first, second, third and fourth axes being spaced apart from and parallel relative to the first pivot axis such that the first pivot axis is offset relative to each of the first, second, third and fourth axes in a first direction and a second direction, the first direction being different than the second direction, and wherein the first, second, third and fourth rollers pivot together about the first pivot axis when the upper module pivots about the first pivot axis, and the lower module having:

a fifth roller rotatably coupled to the lower module about a fifth axis, a sixth roller spaced away from the fifth roller and rotatably coupled to the lower module about a sixth axis, a seventh roller spaced away from the fifth and sixth rollers and rotatably coupled to the lower module about a seventh axis, and an eighth roller spaced away from the fifth, sixth and seventh rollers and rotatably coupled to the lower module about an eighth axis, the fifth, sixth, seventh and eighth axes being spaced apart from and parallel relative to the second pivot axis such that the second pivot axis is offset relative to each of the fifth, sixth, seventh and eighth axes in a first direction and a second direction, the first direction being different than the second direction, and wherein the fifth, sixth, seventh and eighth rollers pivot together about the second pivot axis when the lower module pivots about the second pivot axis.

20. The vehicle restraint of claim 19, wherein a line of contact is maintained between each of the rollers and the track, and at least four lines of contact are maintained in spaced locations along the longitudinal direction of the track.

21. The vehicle restraint of claim 20, wherein the at least four lines of contact distributes a load caused by a vehicle being loaded or unloaded while at the dock.

* * * * *